United States Patent [19]
Takoshima et al.
[11] Patent Number: 4,742,362
[45] Date of Patent: May 3, 1988

[54] THERMAL HEAD

[75] Inventors: Takehiro Takoshima; Yoshimi Kamijo, both of Furukawa, Japan
[73] Assignee: Alps Electric Co., Ltd., Japan

[21] Appl. No.: 922,044
[22] Filed: Oct. 22, 1986
[30] Foreign Application Priority Data
Oct. 23, 1985 [JP] Japan ................................ 60-236844
[51] Int. Cl.[4] ........................ G01D 15/10; B05D 1/36; H01C 1/012
[52] U.S. Cl. ................................ 346/76 PH; 219/216; 338/308; 427/402; 427/126.2; 427/126.4
[58] Field of Search .................... 346/76 PH; 219/216; 338/308; 427/58, 96, 402, 126.2, 126.4

[56] References Cited

U.S. PATENT DOCUMENTS 4,259,564 3/1981 Ohkubo et al. ..................... 219/216

FOREIGN PATENT DOCUMENTS 52-152725 12/1977 Japan .................................. 400/120
57-24275 2/1982 Japan .................................. 400/120
57-83476 5/1982 Japan .................................. 400/120
57-83477 5/1982 Japan .................................. 400/120
58-63475 4/1983 Japan .................................. 400/120

*Primary Examiner*—E. A. Goldberg
*Assistant Examiner*—Gerald E. Preston
*Attorney, Agent, or Firm*—Guy W. Shoup

[57] ABSTRACT

In a thermal head in which a heat generating portion is protruded by partially forming a glass glaze layer on an insulating substrate, a protruding portion is formed on the insulating substrate and the glass glaze layer is formed on the protruding portion. The heat generating portion can sufficiently be protruded to render the contact with the recording paper or ink ribbon favorable, thereby improving the heat efficiency.

7 Claims, 1 Drawing Sheet

THERMAL HEAD

BACKGROUND OF THE INVENTION

1. Field of the Invention

This invention concerns a thermal head for use in a thermal printer and, more specifically, it relates to an improvement for the protruding structure in a heat generating portion.

2. Description of the Prior Art

A thermal head mounted to a thermal printer comprises, for example, a plurality of heat generating resistance elements arranged linearly on an identical substrate, which are heated by electric supply for developing color and performing recording on a heat sensitive recording paper or transferring and performing recording on a common paper by way of an ink ribbon in accordance with this invention.

A thermal head has been prepared so far, for example, as shown in FIG. 4 by partially forming a glass glaze layer 2 on an insulating substrate 1 made of alumina or the like and, further laminating thereover, a heat generating resistance layer 3 made of $Ta_2N$ or the like, an electric power supplying conductor layer 4 made of Al, Ni or the like, an oxidation preventive layer 5 made of $SiO_2$ or the like and a wear resistance layer 6 made of $Ta_2O_5$ or the like successively. In this case, the electric power supplying conductor layer 4 is patterned into a plurality of individual electrodes and a common electrode, between which heat generating portions A are formed. The heat generating portion A is formed at a portion protruded by the glass glaze layer 2, by which a favorable contact with the recording paper or ink ribbon is attained.

Recently, it has been required to the thermal head that recording is possible with a flat surface paper and that a high speed recording is possible. In order to realize the requirements, it is necessary to increase the heat efficiency by improving the heat conductivity of the heat generating portion.

When forming the glass glaze layer 2 on the insulating substrate 1 in the conventional thermal head, a paste prepared by mixing a glass frit and a binder is coated by printing on the insulating substrate 1 followed by sintering. However, the paste as described above, when coated on the insulating substrate 1, spreads laterally due to the surface tension failing to effectively protrude the heat generating portion A. Specifically, the glass glaze layer 2 has a height h of about 40 μm and the lateral width w of about 500–700 μm, which is actually extremely flat. Then, the effect of improving the contact of the heat generating portion A is poor failing to improve the heat efficiency sufficiently.

SUMMARY OF THE INVENTION

The object of this invention is to overcome the foregoing problems in the prior art and to provide a thermal head capable of improving the contact of the heat generating portion by protruding the glass glaze layer sufficiently above the heat insulating substrate thereby improving the heat efficiency.

The foregoing object of this invention can be attained by a thermal head in accordance with this invention in which a protruding portion is formed on an insulating substrate, and a glass glaze layer is formed on the protruding portion.

In this way, since the glass glaze layer is not formed directly on the plane of the insulating substrate but formed on the protruded portion previously formed on the insulating substrate, the glass glaze layer can be effectively protruded. Therefore, the contact of the heat generating portion can be rendered favorable thereby improving the heat efficiency.

The protruding portion formed on the insulating substrate usable in this invention is formed, for example, by screen printing alumina powder in admixture with a binder followed by sintering, or by partially bending a green sheet. The protruding portion preferably has a higher heat conductivity than the glass glaze layer, for increasing the falling rate of the heat generating temperature thereby enabling high speed response.

The extent of the protruding portion previously formed on the insulating substrate is, preferably, from 20 to 100 μm and, more preferably, from 50 to 80 μm. Further, the protruding extent of the glass glaze layer formed on the protruding portion is, preferably, from 10 to 60 μm and, more preferably, from 20 to 40 μm. Then, the total protrusion of the protruding portion and the glass glaze layer (height from the surface of the insulating substrate) is preferably set to about 100 μm. By setting the protruding extent within the above-specified range, the contact of the heat generating portion can effectively be improved.

Although the structure of the thermal head according to this invention has no particular restriction, it can employ such a constitution, for example, prepared by forming a protruding portion and a glass glaze layer on an insulating substrate and then laminating, further thereover, a heat generating resistance layer, an electric power supplying conductor layer, an oxidation preventive layer and a wear resistance layer successively.

BRIEF DESCRIPTION OF THE ACCOMPANYING DRAWINGS

These and other objects, features, as well as advantageous of this invention will become apparent by reading the descriptions for the preferred embodiments according to this invention while referring to the accompanying drawings, wherein FIG. 1 is a cross sectional view for a portion of one embodiment of a thermal head according to this invention, FIG. 2 is a cross sectional view for a portion of another embodiment of a thermal head according to this invention, FIG. 3 is a cross sectional view for a portion of a further embodiment of a thermal head according to this invention, and FIG. 4 is a cross sectional view for a portion of one embodiment of a conventional thermal head.

DESCRIPTION OF PREFERRED EMBODIMENTS

Figure 1:
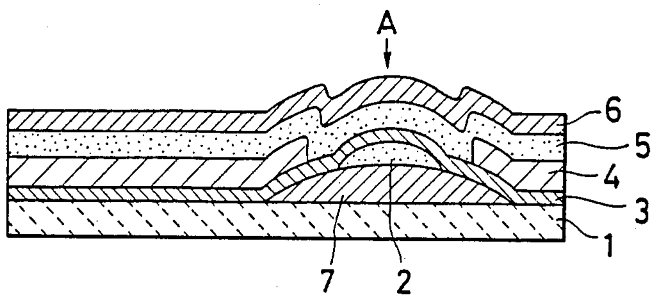

FIG. 1 shows one embodiment of a thermal head according to this invention.

In this thermal head, a protruding portion 7 prepared by partially screen-printing a paste mixture composed of an alumina powder and an organic binder followed by sintering is disposed on an insulating substrate 1 such as made of alumina. Then, the glass glaze layer 2 is formed by screen-printing a paste mixture composed of a glass frit and an organic binder on the protruding portion 7. In this embodiment, the glass glaze layer 2 is partially formed on the protruding portion 7. Accordingly, the glass glaze layer 2 protrudes considerably above the insulating substrate 1 and, specifically, it protrudes by about 100 μm from the upper surface of the insulating substrate 1. Then, a heat generating resistance layer 3 made of $Ta_2N$ is formed to a thickness of 0.05 μm on these layers. An undercoat layer not illustrated may be disposed between the glass glaze layer 2 and the heat generating resistance layer 3 so that the glass glaze layer 2 does not suffer from corrosion due to the fluoric acid type etching solution. An electric power supplying conductor layer 4 made of an Al film is formed to a thickness of 1.5 μm on the heat generating resistor layer 3. The electric power supplying conductor layer 4 is pattern-etched into individual electrodes and a common electrode, between which are disposed heat generating dot portions merely composed of the heat generating resistance layer 3. An oxidation preventive layer 5 made of $SiO_2$ to a thickness of 2 μm is formed on the electric power supplying conductor layer 4 and, a wear resistance layer 6 made of $Ta_2O_5$ is formed to a thickness of 5 μm further on the oxidation preventive layer 5. Each of these layers can be formed by way of sputtering or vacuum deposition.

Since the glass glaze layer 2 is formed on the protruding portion 7 in this thermal head, the heat generating portion A can further be protruded to render the contact with the recording paper or ink ribbon favorable, thereby improving the heat efficiency. Further, since the portion can be protruded sufficiently even if the amount of the glass glaze layer 2 is small, and since the glass glaze layer 2 is in contact at the lower surface thereof with highly heat conductive alumina, the falling rate of the heat generation is also increased and, accordingly, a high speed response is possible.

Figure 2:
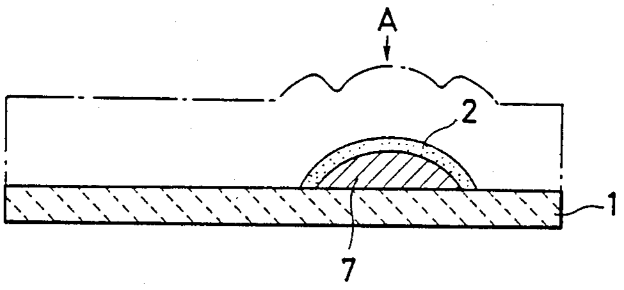

FIG. 2 shows another embodiment of the thermal head according to this invention, in which those portions having the same structure as in FIG. 1 carry the same reference numerals and the explanations therefor are omitted.

In this thermal head, a protruding portion 7 prepared by partially screen-printing a paste mixture composed of an alumina powder and an organic binder, followed by sintering is disposed on an insulating substrate 1 and, further, a glass glaze layer 2 prepared by screen-printing a paste mixture composed of a glass frit and an organic binder, followed by sintering is further formed on the entire upper surface of the protruding portion 7. In this case, since the paste mixture composed of the alumina powder and the organic binder can be protruded sufficiently with no lateral spreading when coated by printing on the insulating substrate 1, a sufficient extent of protrusion can be obtained if the glass glaze layer 2 is formed thereover with a uniform thickness.

Figure 3:
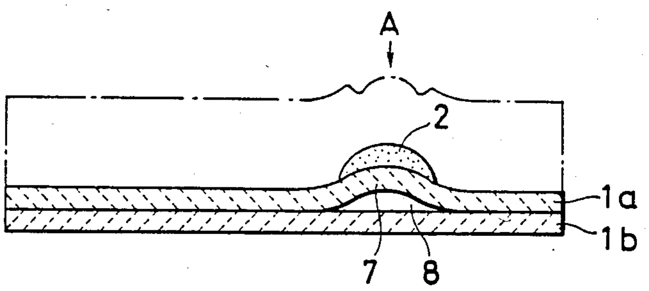
Figure 4:
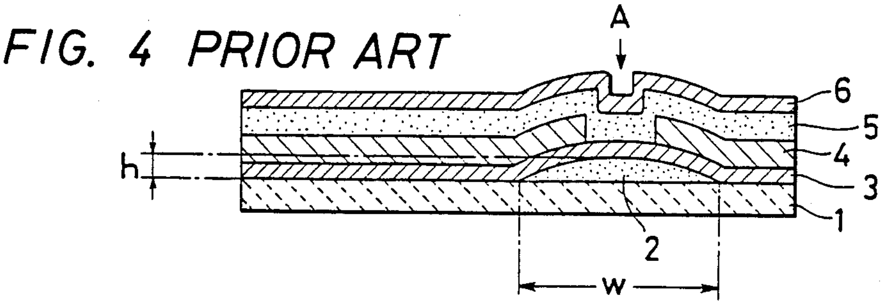
FIG. 4 PRIOR ART

FIG. 3 shows a further embodiment of the thermal head according to this invention, in which the portions of the same constitution as those in FIG. 1 carry the same reference numerals and the explanations therefor are omitted.

In this thermal head, an insulating substrate is composed of two sheets of alumina substrates 1*a*, 1*b* in which the upper substrate 1*a* is partially bent to constitute a protruding portion 7. That is, the substrates 1*a*, 1*b* are formed by partially bending a green sheet, for example, by pressing and then appending the sheet to another green sheet, followed by sintering. Then, the glass glaze layer 2 is formed on the protruding portion 7. Also in this thermal head, the heat generating portion A can be protruded sufficiently.

Further, in the aforementioned embodiment, the gap 8 at the protruding portion 7 of the alumina substrates 1*a*, 1*b* may be filled with glass glaze or metal, or it may be left as it is. Further, the insulating substrate may be constituted only with the alumina substrate 1*a*.

As has been described above according to this invention, since a protruding portion is formed on an insulating substrate and a glass glaze layer is formed on the protruding portion, the heat generating portion can be protruded sufficiently to render the contact to the recording paper or ink ribbon favorable thereby improving the heat efficiency.

What is claimed is:

1. A thermal head having at least a heat generating resistor layer, a conductor layer, and a protective layer applied successively on an insulating substrate, said heat generating resistor layer being protruded from the insulating substrate in the vicinity of a desired heat generating area by being formed over a two-stage protruding structure formed on the insulating substrate, said two-stage structure comprising a first protruding portion on the insulating substrate made of heat conductive material and spanning the heat generating area, and a smaller, glass glaze layer formed on top of a central part of the first protruding portion and disposed centrally in the heat generating area.

2. A thermal head as defined in claim 1, wherein the protruding extent of the protruding portion formed on the insulating substrate is from 20 to 100 μm.

3. A thermal head as defined in claim 2, wherein the protruding extent of the protruding portion formed on the insulating substrate is from 50 to 80 μm.

4. A thermal head as defined in claim 1, wherein the protruding extent of the glass glaze layer formed on the protruding portion is from 10 to 80 μm.

5. A thermal head as defined in claim 4, wherein the protruding extent of the glass glaze layer formed on the protruding portion is from 20 to 40 μm.

6. A thermal head as defined in claim 1, wherein the protruding portion is made of an alumina powder and a binder sintered together.

7. A thermal head as claimed in claim 1 wherein said insulating substrate is an alumina substrate layer, and said protruding portion is a layer of the same material which is curved upwards in the heat generating area.

* * * * *